US 11,446,591 B2

(12) United States Patent
Banna et al.

(10) Patent No.: US 11,446,591 B2
(45) Date of Patent: Sep. 20, 2022

(54) NON-METALLIC LATERALS FOR FILTRATION AND WATER TREATMENT

(71) Applicant: SAUDI ARABIAN OIL COMPANY, Dhahran (SA)

(72) Inventors: Rakan Wajdi Banna, Al Khobar (SA); Ahmed Mohsen Orfali, Dhahran (SA); Imran A. Khan, Abqaiq (SA); Ensan Mahmoud El-ayoubi, Abqaiq (SA); Abdulaziz Y. Asiri, Dammam (SA); Mirza Mansoor Baig, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 26 days.

(21) Appl. No.: 17/017,068

(22) Filed: Sep. 10, 2020

(65) Prior Publication Data

US 2022/0072455 A1     Mar. 10, 2022

(51) Int. Cl.
*B01D 29/21*     (2006.01)
*C02F 1/00*     (2006.01)
(Continued)

(52) U.S. Cl.
CPC ....... *B01D 29/216* (2013.01); *B01D 39/1692* (2013.01); *C02F 1/004* (2013.01);
(Continued)

(58) Field of Classification Search
CPC ........... B01D 29/216; C02F 1/004; C02F 1/52
(Continued)

(56) References Cited

U.S. PATENT DOCUMENTS 8,021,455 B2 *   9/2011   Adamek ............... B01D 46/10
                                                    55/486
8,147,693 B2 *   4/2012   Terry ................... B01D 29/111
                                                    210/338
(Continued)

FOREIGN PATENT DOCUMENTS

CN           208195652 U     12/2018
DE       202007012613 U1     1/2009
(Continued)

OTHER PUBLICATIONS

"Bollfilter Protection Systems: Automatic and Manual Filtration Systems", Product Brochure, Bollfilter UK Limited, Boll & Kirch, Apr. 2017 (28 pages).
(Continued)

*Primary Examiner* — Nina Bhat
(74) *Attorney, Agent, or Firm* — Osha Bergman Watanabe & Burton LLP (57) ABSTRACT

A lateral filter, a method of its use, and a system incorporating at least one lateral filter are provided. The lateral filter includes a filter screen that includes a screen wire and screen support rod comprise a non-metallic material and are a unitary, integrated, inseparable, and singular component. In using the lateral filter, a fluid entrained with solids is introduced through an exterior-facing side and permeate forms in the interior of the filter. The solids remaining in the permeate, if any, have a smallest dimension that is less than a width of a slot in the filter screen. The permeate passes from the interior of the lateral filter. Lateral filters may be incorporated into a system comprising many lateral filter, such as sand filter is configured to filter raw seawater.

20 Claims, 6 Drawing Sheets

(51) Int. Cl.
  *B01D 39/16* (2006.01)
  *C02F 1/50* (2006.01)
  *C02F 1/52* (2006.01)
  *C02F 103/08* (2006.01)

(52) U.S. Cl.
  CPC ............... *C02F 1/50* (2013.01); *C02F 1/52* (2013.01); *B01D 2201/0415* (2013.01); *B01D 2201/4092* (2013.01); *C02F 2103/08* (2013.01); *C02F 2303/04* (2013.01)

(58) Field of Classification Search
  USPC ........................................................ 210/702
  See application file for complete search history.

(56) References Cited

U.S. PATENT DOCUMENTS

| | | | | |
|---|---|---|---|---|
| 8,714,722 | B2* | 5/2014 | Hays | B41J 2/17563 347/93 |
| 9,023,456 | B2* | 5/2015 | Flansburg | B01D 29/111 428/141 |
| 10,981,335 | B2* | 4/2021 | Rodriguez | B01D 46/0001 |
| 11,052,332 | B2* | 7/2021 | Rodriguez | B01D 29/333 |
| 11,058,977 | B2* | 7/2021 | Rodriguez | B01D 46/0001 |
| 2002/0027101 | A1* | 3/2002 | Insley | B01D 39/1692 210/488 |
| 2004/0026313 | A1* | 2/2004 | Arion | B01D 29/15 210/484 |
| 2008/0073298 | A1 | 3/2008 | Smith et al. | |
| 2012/0018369 | A1 | 1/2012 | Markgraf | |
| 2016/0038866 | A1* | 2/2016 | Gibson | B01D 39/2093 210/435 |
| 2016/0278605 | A1* | 9/2016 | Miller | B08B 3/14 |
| 2016/0287048 | A1* | 10/2016 | Thiyagarajan | A47L 15/4206 |
| 2017/0274302 | A1* | 9/2017 | Denk | B01D 29/33 |
| 2018/0050288 | A1* | 2/2018 | Jakop | C02F 1/001 |
| 2018/0093231 | A1* | 4/2018 | Roberts | C02F 3/165 |
| 2020/0023300 | A1 | 1/2020 | Rodriguez et al. | |
| 2021/0177430 | A1* | 6/2021 | Tal | A61M 25/0051 |

FOREIGN PATENT DOCUMENTS

| | | |
|---|---|---|
| EP | 0259696 A1 | 3/1988 |
| JP | 2000117013 A | 4/2000 |
| WO | 2014174323 A1 | 10/2014 |
| WO | 2018122985 A1 | 7/2018 |

OTHER PUBLICATIONS

"Novel 3D printed Filter: Wedge Wire", CROFI Additive Manufacturing LTD, Updated 2019; URL: <https://www.croftam.co.uk/project_category/design-to-add-value/> (3 pages).

Banna, Rakan, "(IR 4.0) 3DPrinting for Sand Filter Laterals", Water Arabia Conference, Saudi Aramco, Feb. 2020 (26 pages).

International Search Report and Written Opinion issued in International Application No. PCT/US2020/053717, mailed Mar. 2, 2021 (13 pages).

* cited by examiner

NON-METALLIC LATERALS FOR FILTRATION AND WATER TREATMENT

BACKGROUND

Wedge wire lateral (WWL) filters are configured to remove particulates from fluids to prevent contamination of the fluids and to prevent solids passage. The passing of solids can cause damage to downstream industrial processes, equipment, especially pumps, compressors, and other equipment that uses rotational elements. Contamination by small solids may even result in hindered production of oil and gas reservoirs due to clogged pores in the hydrocarbon-bearing formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The scope of the disclosure includes embodiment lateral filters, methods of using the embodiment lateral filters, and systems using embodiment lateral filters.

In one aspect, the disclosed scope provides for a lateral filter. Embodiment lateral filters comprise a filter screen. The filter screen may comprise a screen wire and a screen support rod. The screen wire is configured such that there is a slot having a width through which a fluid and a solid having a smallest dimension that is less than the width of the slot may traverse from an exterior-facing side to an interior-facing side of the lateral filter. The filter screen in part defines the interior-facing side and the exterior-facing side of the lateral filter. The filter screen comprises, consists essentially of, or consists of a non-metallic material, and is a unitary, integrated, inseparable, and singular component.

In another aspect, a method comprises introducing a fluid entrained with solids to an embodiment lateral filter. The introduction is such that the introduced fluid enters the lateral filter through an exterior-facing side of a filter screen of the lateral filter and forms a permeate fluid in an interior of the lateral filter. The introduction occurs such that the permeate fluid may have a reduced amount of solids as compared to the introduced fluid and that any solids in the permeate fluid have a smallest dimension that is not greater than a width of a slot in the filter screen of the lateral filter. The lateral filter comprises, consists essentially of, or consists of a non-metallic material; is a unitary, integrated, inseparable, and singular component; and comprises both the filter screen with the slot having the width and a proximal connector configured to pass permeate from the interior of the lateral filter. The method also comprises passing the permeate fluid from the interior of the lateral filter through the proximal connector.

In yet another aspect, a system comprises a sand filter. The sand filter further comprises an embodiment lateral filter. The sand filter is configured to receive an introduced fluid entrained with solids and to pass a permeate fluid. Such a permeate fluid may have a reduced amount of solids as compared to the introduced fluid, where any solids in the permeate fluid have a smallest dimension that is not greater than the width of the slot in the filter screen of the lateral filter. The lateral filter comprises, consists essentially of, or consists of a non-metallic material and is a unitary, integrated, inseparable, and singular component.

Other aspects and advantages of this disclosure will be apparent from the following description made with reference to the accompanying drawings and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

In the figures, down are toward or at the bottom and up are toward or at the top of the figure. Use of a prime symbols (', ", "') indicates a like element in a different state, mode, position, or configuration than previously described; however, all other aspects are the same.

DETAILED DESCRIPTION

Current wedge wire laterals (WWLs) are fabricated from metals, especially stainless steel, due to flexibility, workability and familiarity of such materials. However, such materials, especially in aqueous service, and especially in seawater or brine-filtration service, suffer from frequent failures. Corrosion, pitting, and chloride cracking often cause extensive damage to such sensitive filters. However, materials that are resistant to such chemical attack by salts and acids, such as polymeric, ceramics, and glasses, cannot be handled in a similar manner as metals to construct such WWLs. Such materials lack the flexibility and formability of traditional metalworking techniques. As well, the precise filtration specifications—the gauge of the gap between the coils of the lateral—cannot be met with traditional polymer, ceramic and glass-forming techniques.

An embodiment lateral filter is configured such that a fluid entrained with solids that is introduced into the lateral filter forms a permeate fluid in the interior of the lateral filter. The filter may reduce the number of solids entrained in the fluid, that is, the permeate fluid may have fewer total solids entrained in it than the introduced fluid. In some instances, there are no solids in the permeate that remain entrained. The size of any entrained solids in the permeate fluid have a smallest dimension that is less than the size of the width of the slot of the filter screen of the embodiment lateral filter. Solids filtered from the introduced fluid may include minerals, sand, salts, biologics, flocculants, and other non-liquid, non-dissolved materials. Liquids (based upon surface tension), solids having a smallest dimension smaller than the width of the slot of the filter screen, and gases, may pass through the filter screen. The lateral filter configuration balances two desired aspects: to maximize throughput of permeate for use in downstream activities but not to allow solids having a particular size or larger to pass through. This second aspect avoids potential damage to sensitive mechanical and rotating equipment, such as pump impellers and seals.

There are several advantages of fabricating the filter screen of the lateral filter out of a non-metallic material. For example, exposure to a saline fluid, such as seawater, brine, or production fluid, does not corrode, rust or pit non-metallic materials whereas metals, like steel, can be damaged by such fluids. Even a minor or insignificant-appearing abrasion on a metal surface can lead to catastrophic corrosion. In an embodiment, the non-metallic material may be pH resistant, that is, it is able to operate in an acidic, alkaline, or both, environments. This may permit treatment of the introduced fluid before passing through the filter, whereas with a metallic version of the same filter that may not be possible. In some instances, an amount of weight may be saved by changing the material of the filter from a metallic to a non-metallic material. The overall reduction in component weight would reduce long-term load stress on vessels and pads. In some such instances, there can be a weight savings while also providing similar or even greater structural strength over similarly configured metallic materials. In some embodiments, the expansion/contraction coefficient for the non-metallic material may be less than a similarly-configured metallic version, which would prevent leaks into or out of the permeate connection, slot width expansion or collapse, or having different materials pulling away from one another or creating stress due to excessive expansion due to temperature changes.

One of ordinary skill in the art can appreciate that typical filter screen fabrication techniques cannot be used to fabricate non-metallic versions of the lateral filter. However, additive manufacturing, such as atomic layer deposition (ALD), chemical vapor deposition (CVD), and fused deposition modeling/fused filament fabrication (FDM/FFF), can be used to build the filter screen and other components of the lateral filter layer-by-layer. Using such manufacturing processes, the slot width of the filter screen and additional components fabricated together in such an amalgamated manner may preserve the traditional desirable aspects of metallic versions of "wedge wire" type filter screens while also enhancing the properties of the lateral filter overall with the advantages of non-metallic composition and unity of traditionally disparate or separate parts.

In this application, the lexicography of the term "wire" is used in a descriptive rather than a functional sense. In addition to the prior comments about general manufacturing of the non-metallic lateral filters, the term "wire", such as in "screen wire", is meant to evoke the configuration, shape and relative design such as that of a traditional wound or woven wire in a traditional metallic-comprised lateral filter, such as a wedge wire lateral (WWL). However, one of ordinary skill in the art readily appreciates that the disclosed embodiment non-metallic filter laterals having non-metallic "wire" does not have the same properties of malleability as a metallic wire. The non-metallic "wire" may not be easily distorted, reformed, shaped, or modified, either acutely or repeatedly, as a metallic wire may. As well, both the metallic and non-metallic "wires" are not formed or incorporated into their respective lateral filters in the same manner, as will be described.

Lateral Filter

Figure 1:
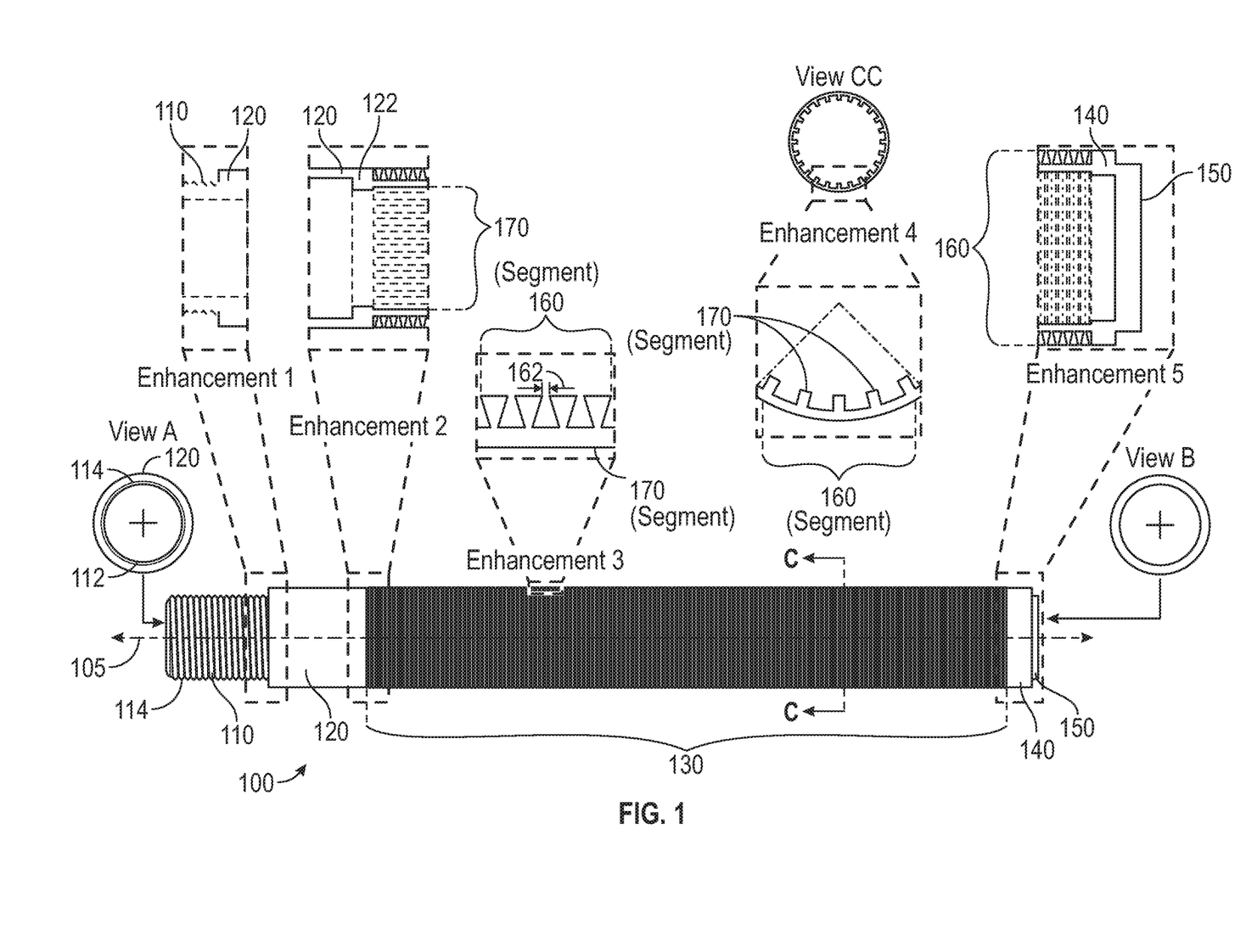
FIG. 1 shows an illustration an exterior view of an embodiment lateral filter.

FIG. 1 shows an illustration an exterior view of an embodiment lateral filter. Embodiment lateral filter 100 is shown with several components, including a proximal connector 110, a proximal support ring 120, a filter screen 130, a distal support ring 140, and a distal end cap 150. There is also a lateral central axis 105 (dotted dual-headed arrow) passing through center along the long axis of the lateral filter 100.

FIG. 1 has several views for better appreciating embodiment lateral filter 100. View A is from the perspective of the proximal end of the lateral filter 100. A black cross characterizes lateral central axis 105. View A permits a perspective of observing into the interior of the filter from an end of the lateral filter 100. As can be seen from this view and FIG. 1, proximal connector 110 in this configuration is a hollow conduit that permits fluid to traverse between the interior of the lateral filter 100 and the opening 112 in the end of the proximal connector 110. Proximal connector 110 is also seen with coupling threads 114. From View A, proximal support ring 120 is also seen as mostly hollow from this perspective.

View B is from the perspective of the distal end of the lateral filter 100. A black cross characterizes lateral central axis 105. View B shows that in this configuration of the lateral filter 100 the distal end is sealed by distal end cap 150. View B also shows a portion of distal support ring 140.

View CC is a mid-lateral slice in the section of the lateral filter 100 with the filter screen 130. A black cross characterizes lateral central axis 105. View CC reveals a circular "ring" of screen wire 160. Along the interior edge of the screen wire 160 are a plurality of screen support rods 170 radially distributed around the inner circumference. Although appearing as potentially separate components, the screen wire and the screen support rods are amalgamated.

FIG. 1 also shows some enhancements of the drawing of embodiment lateral filter 100. Enhancement 1 shows an exterior portion of the lateral filter 100 near the proximal end. A portion of the proximal connector 110 and a portion of the proximal support ring 120 are seen. Coupling threads 114 are featured on proximal connector 110 of embodiment lateral filter 100. There are no lines of separation and there is no indication of attaching one component to another, such as by bonding, welding, adhesive, fastener or other post-manufacturing attachment process or means. In other words, the two components appear to be formed of one piece of material. By all indications for lateral filter 100, the proximal connector 110 and the proximal support ring 120 appear amalgamated into a unitary, integrated, inseparable, and singular component that is connected to one another.

Enhancement 2 shows a portion of the lateral filter 100 as if a segment of the exterior has been removed, revealing a remaining portion of the proximal support ring 120, several screen support rods 170, and several "rings" of screen wire 160. Where the screen wire 160 would appear in the background has been removed for clarity of the image. As can be observed, a ridge 122 is formed in proximal support ring 120 on the distal end of its interior-facing side. For the embodiment lateral filter 100, the several screen support rods 170 shown and portion of the proximal support ring 120 appear amalgamated into a unitary, integrated, inseparable, and singular component that is connected to one another at the ridge 122.

Enhancement 3 shows a portion of the lateral filter 100 as if a portion of the filter screen 130 has been removed, showing a portion of a screen support rod 170. Several parts of adjacent "rings" of screen wire 160 are connected to the screen support rod 170. There does not appear to be any separation between the screen wire 160 "rings" and the support rods 170. The screen wires 160 and the screen support rod 170 in Enhancement 3 appear amalgamated into a unitary, integrated, inseparable, and singular component that is connected to one another. Spaces between adjacent portions of the screen wire define the slot 162. Through these slots 162 in the filter screen 130 the conversion of filtrate into permeate occurs as fluid and suspended solids pass (or do not) into the interior of lateral filter 100.

Enhancement 4 is taken from the View CC and shows a segment of the one "ring" screen wire 160. This enhancement reveals several screen support rods 170 connected to the screen wire 160. As with Enhancement 3, there does not appear to be any separation between the screen wire 160 ring and the support rods 170. In Enhancement 4, the screen wire 160 and the screen support rods 170 appear amalgamated into a unitary, integrated, inseparable, and singular component that is connected to one another.

Enhancement 5 shows a portion of the lateral filter 100 as if a segment of the exterior has been removed, revealing a remaining portion of the distal support ring 140, a pair of screen support rods 170, several "rings" of screen wire 160, and a portion of the distal end cap 150. Most of the support rods 170 would appear in background (in front of the screen wire 160) have been removed for clarity of the image; two remain for representation. For the embodiment lateral filter 100, as with proximal support ring 120, the screen support rods 170 shown and portion of the distal support ring 140 appears to be amalgamated into a unitary, integrated, inseparable, and singular component connected together on the proximal side of distal support ring 140. In other words, the two components appear to be formed of one piece of material. In addition, distal end cap 150 and distal support ring 140 appear amalgamated into a unitary, integrated, inseparable, and singular component that is connected to one another on the distal side of the distal support ring. And, as previously stated, the plurality of screen wires and the several screen support rods appear to be a unitary, integrated, inseparable and singular component that is connected to one another.

Those of ordinary skill in the art appreciate that the lateral filter may take a variety of external 3-dimensional (3D) geometric configurations, for example, a triangular, square, rectangular, pentagon, or hexagon-based prism, or an irregular-shaped prism, and retain many of the aspects described. For the sake of both brevity and clarity, a cylindrical-shaped lateral filter is used as the descriptive embodiment; however, that should not be interpreted as a limit on the variety of designs configurations embodiment lateral filters may take.

In embodiment of the filter lateral, the filter lateral comprises a plurality of components. Two or more components of embodiment filter laterals are configured such that they are a unitary, integrated, inseparable and singular component. That is, two or more components that would be traditionally fabricated, attached, bonded to one another using traditional manufacturing techniques are instead presented as singular, amalgamated components. The components are part of a singular, greater, continuous component. In such embodiments, the materials of construction for each component are the same. There is no chemical or physical means for separating the two components without destroying the component—the two or more components are a singular item. The two or more components may be fabricated simultaneously together using additive or other manufacturing techniques, such as those previously described. The lack of chemical or physical attachment or bonding means that for the totality of the structure has a greater overall strength as well as a superior ability to distribute stresses and forces throughout the combined components such that the component has an improved resilience over prior configurations that are coupled using mechanical, physical or chemical means.

In embodiment of the lateral filter, two or more components are made of a non-metallic material. In some embodiments of the lateral filter, all components of the lateral filter are made of non-metallic materials. In some embodiments, the non-metallic material is a polymeric material. In some such embodiments, the components of the lateral filter comprise a polycarbonate material. For example, LEXAN™ AM110F filament is a general-purpose polycarbonate useful for additive manufacturing and is made by SABIC (Riyadh, Saudi Arabia). In some embodiments, the components of the lateral filter member is comprised of acrylonitrile butadiene styrene (ABS) polymer material. For example, CYCOLAC™ AMMG94F filament is a general-purpose ABS useful for additive manufacturing and is made by SABIC. Other useful polymers include perfluorinated and fluorinated polymers. The components of or embodiment lateral filters may comprise other polymer materials that are configured for being formed into a component using additive manufacturing.

In some embodiments, all of the components of the lateral filter are made from the same non-metallic material. In some other embodiments, different components of the lateral filter may be configured using different non-metallic materials. For example, some components of the filter screen, which converts filtrate into permeate and retentate, may be comprised of a first non-metallic material that has more flexibility and resilience against direct fluid flow. Another component of the lateral filter, for example, the proximal support ring, may be comprised of a second non-metallic material that is more rigid and has greater mechanical strength. In some such instances, the first and the second non-metallic material may comprise the same non-metallic material, for example, ABS, but the first and the second non-metallic material may comprise different additive packages that provide for different physical properties, such as previously described. In some embodiments of the filter lateral, all of the components are configured such that they are a unitary, integrated, inseparable and singular component. One of ordinary skill in the art may envision that with the variety and number of components that make up embodiment filters that any or all of the components may be fabricated together so as to form singular, unitary parts. Embodiment filters include where all of the component parts of the filter are fabricated in series or in parallel such that any or all of the components form a singular, unitary unit. As previously described, additive manufacturing, can be used to construct parts of or the entire filter layer-by-layer.

Embodiment filter laterals comprise a filter screen comprised of screen wire and screen support rods that are integrated such that they are a singular component. In embodiments, the screen wire and the screen support rods are configured such that they are a unitary, integrated, inseparable and singular filter screen component. The screen wire has an exterior-facing side and an interior-facing side similar to that of the lateral filter. In embodiment filter lateral 100, the screen wire 160 is shown relative to the screen support rods 170 on the exterior-facing side; the screen support rods 170 are on the interior-facing side.

In other instances, the screen support rods may be configured such that they are on the exterior-facing side of the filter lateral. In such an instance, the screen wire may be on the interior-facing side. This type of filter screen configuration is known as an "inverse" screen configuration.

In embodiment filter laterals, the number of screen support rods used may be a reasonable number to provide mechanical support to the screen wire without unduly hindering, blocking or otherwise obstructing the slot formed between adjacent portions of the screen wire along a portion of the central lateral axis of the lateral filter. The slot permits portions of the filtrate to pass through the filter screen and form permeate in the interior of the lateral filter. In some embodiments, the number of screen support rods may be in a range of from about 4 to about 32.

Figure 2A:
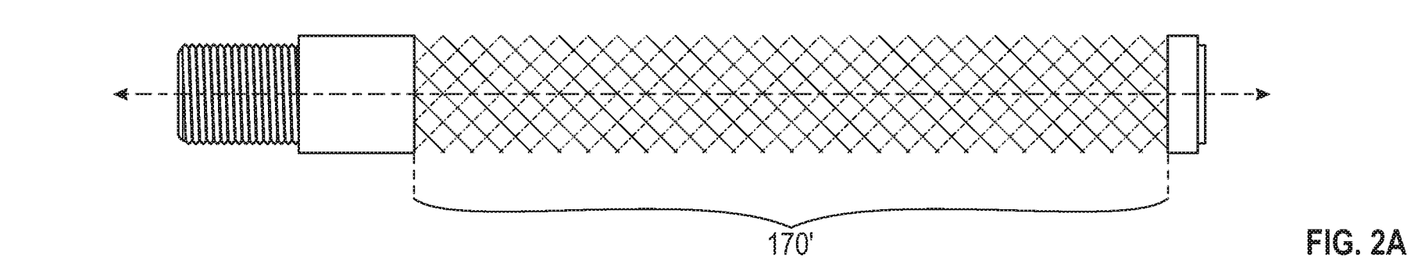
FIGS. 2A-C show an illustration of several variations of screen support rod configurations for embodiment lateral filters.
Figure 2B:
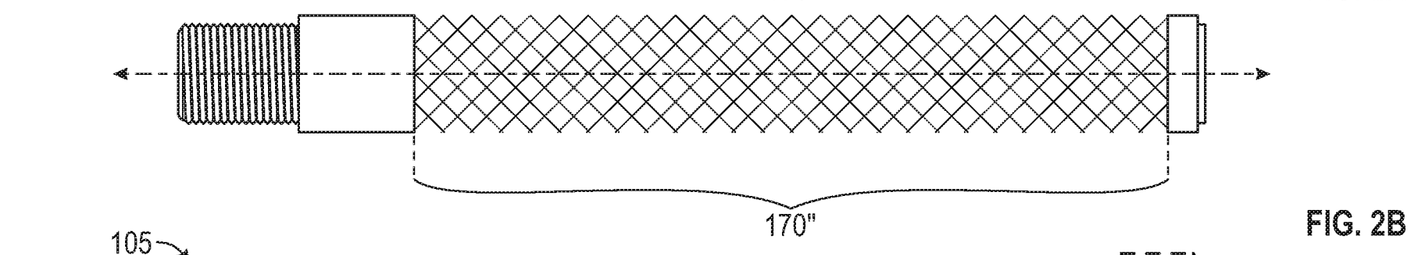
Figures 2C, 2D:
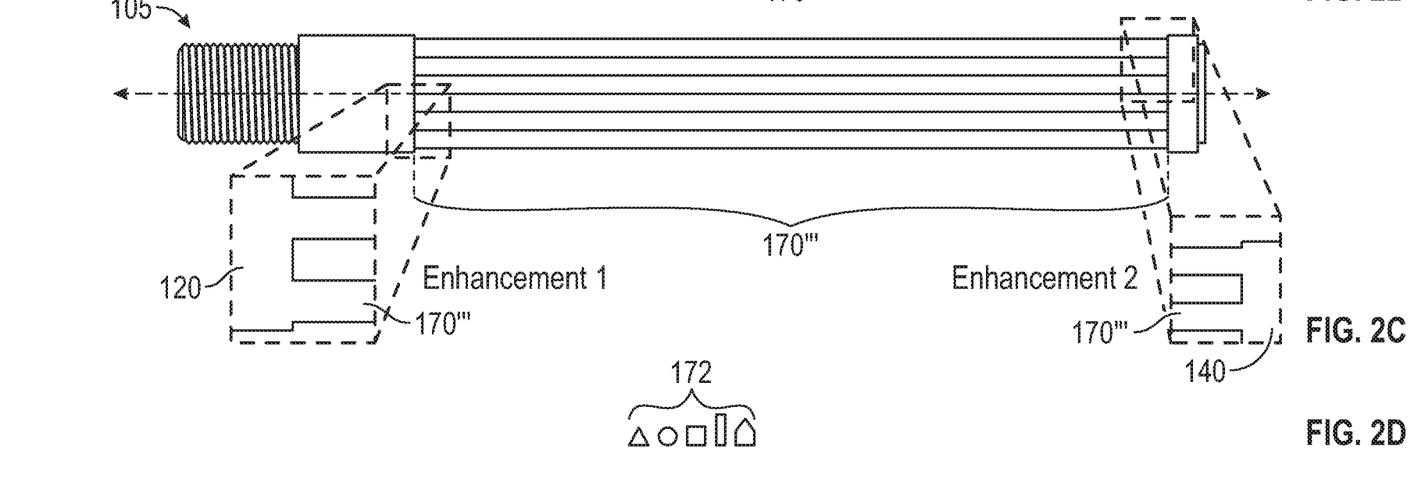
FIG. 2D shows an illustration of several variations of cross sections for screen support rods used in embodiment lateral filters.

FIGS. 2A-C show an illustration of several variations of screen support rod configurations for embodiment lateral filters. For example, an embodiment lateral filter may use a multi-helical screen support rod configuration to support the screen wire for the filter screen. As shown in FIG. 2A, several screen support rods 170' wind in a nested helical pattern from the proximal support ring to the distal support ring. A feature of such a pattern is that the screen support rods do not cross each other. In FIG. 2B, an embodiment lateral filter may use several screen support rods 170" configured in a lattice pattern, that is, crossing to form "X"s, to provide support to the screen wire of the filter screen. FIG. 2C shows that an embodiment lateral filter may also use an axial screen support rod 170''' configuration, that is, where the screen support rods run parallel to the lateral central axis 105. In a non-pictured embodiment (but partially shown in FIG. 3B), it is envisioned that screen support rods are configured in a circumferential, radial or "ring" pattern to provide support to the screen wire in embodiment filter laterals. Also not pictured but envisioned in embodiment filter laterals is a trestle pattern screen support rod configuration, where the "X"s of the lattice pattern are bound by axial, circumferential, or both axial and circumferential screen support rods. As previously described, screen support rods in some instances may also be positioned on the exterior-facing side of the screen in an "inverse" filter screen configuration. Other screen support rod configurations are envisioned that provide appropriate mechanical support for the screen wire without significant obstruction to the filtrate passing through the filter screen.

FIG. 2C also shows some enhancements. Enhancement 1 shows the continuous, seamless material relationship between proximal support ring 120 and axial screen support rod 170" components such that both are part of the same component. Enhancement 2 shows the continuous, seamless material relationship between distal support ring 140 and axial screen support rod 170" components such that both are part of the same component. In effect, Enhancements 1 and 2 of FIG. 2C show that in some embodiments of the lateral filter, the proximal support ring, the screen support rods, and the distal support ring are all are configured such that they appear amalgamated into a unitary, integrated, inseparable, and singular component that is connected to one another. Although the Enhancements are showing inseparability for the configuration of FIG. 2C, one of ordinary skill in the art understands that the other described and non-shown configurations also have similar continuous, seamless material relationship between the screen support rod configurations and either or both of the proximal and distal support rings.

FIG. 2D shows an illustration of several variations of cross sections for screen support rods used in embodiment lateral filters. The screen support rods along its length has a cross-sectional configuration. Screen support rod 170 cross-sections 172 show common geometric shapes, such as a circle, a triangle, a square, and a rectangle. Other common geometric shapes for screen support rods include a square with a triangle configuration, where the triangle portion is the portion of the screen support rod that connects to the screen wire. Other geometrical and non-geometrical cross-sections for screen support rods are envisioned.

The use of the plurality of screen support rods in the filter screen does not preclude other internal structural support or bracing for the lateral filter or the filter screen. As long as the other supports do not interfere with the movement of permeate through the lateral filter, additional supports not shown are envisioned as part of embodiment lateral filters. In such instances, such supports can be manufactured simultaneously and integrated with the lateral filter and screen support rods along with other portions of the embodiment lateral filter.

Figure 3A:
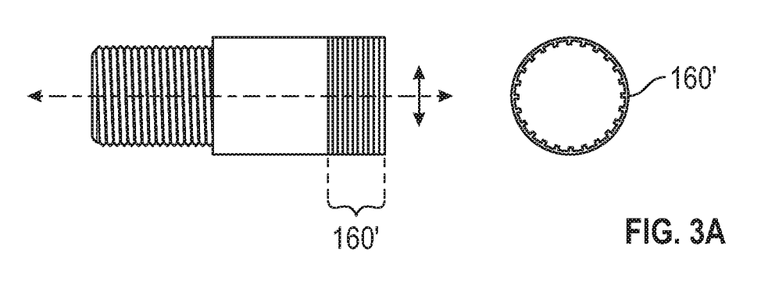
FIGS. 3A-C show an illustration of several variations of screen wire configurations for embodiment latera filters.
Figure 3B:
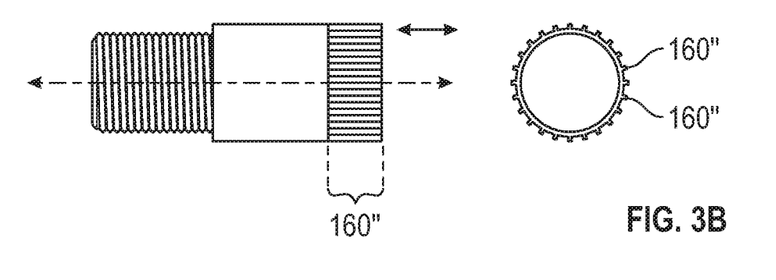
Figure 3C:
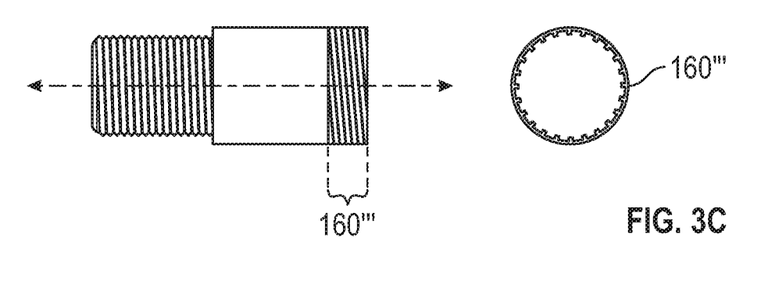

The other component of the filter screen is the screen wire. The screen wire has a configuration such that slots are present in the screen. FIGS. 3A-C show an illustration of several variations of screen wire configurations for embodiment latera filters. In FIG. 3A, the screen wire 160' form a separate "ring", where each radially or circumferentially configured screen wire is perpendicular to the lateral central axis 105 (see solid double-headed arrow). Each circumferentially-configured screen wire is equidistantly spaced from adjacent "rings", thereby defining a slot. Each slot is also approximately radial or circumferential in shape. In FIG. 3B, the screen wire 160" are configured in lateral "rods" or "strips", where each axial-configured screen wire is parallel to the lateral central axis 105 (see solid double-headed arrow), is evenly distanced radially from the lateral central axis 105, and is equally distributed circumferentially. The equidistant spacing between adjacent "rods" defines the slot, which is approximately axial in configuration as well. In FIG. 3C, the screen wire 160''' is in a helical configuration (see solid double-headed arrow). A single screen wire or multiple screen wires may be used to form the helix pattern along a portion of the long length of the lateral filter. The slot is also defined in an approximately helical pattern. Other screen wire configurations are envisioned.

Figure 3D:
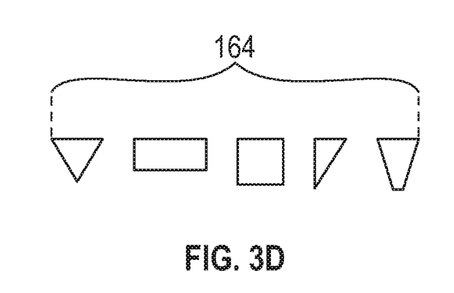
FIG. 3D shows an illustration of several variations of cross sections for screen wire used in embodiment lateral filters.

FIG. 3D shows an illustration of several variations of cross sections for screen wire used in embodiment lateral filters. The screen wire along its length has a cross-sectional configuration. Screen wire 160 cross-sections 162 show common geometric shapes, such as a equilateral triangle, right triangle, square, rectangle, and trapezoid, or more commonly known in the industry as "wedge". Other geometrical and non-geometrical cross-sections for screen wire are envisioned.

Figure 3E:
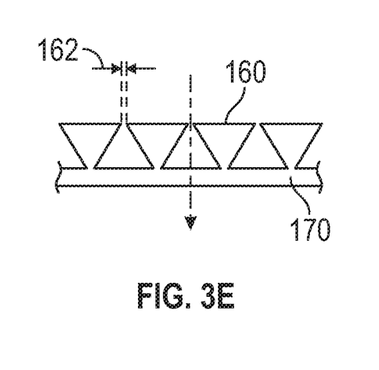
FIG. 3E illustrates filtrate passing through a slot between adjacent screen wire components.

Adjacent passes or portions of the screen wire define gaps between the screen wires called the slot. The slot permits filtrate to pass into the filter lateral interior and become permeate. Solids in the filtrate having a smallest dimension that is greater than the width of the slot cannot pass the filter screen and are rejected. FIG. 3E illustrates filtrate passing through a slot between adjacent screen wire components. The slot 162 permits fluid flow (dot-dot-dash arrow) to pass from the exterior-facing side to the interior-facing side of the filter screen between the two different portions of the screen wire 160 that are adjacent to one another that define the dimensions of the slot 162.

In some embodiments, the slot size is in a range of from about 0.0008" (about 20 microns) to about 0.265" (about 6730 microns), such as from about 0.0015" (about 37 microns) to about 0.0098" (about 250 microns), such as from about 0.0049" (about 125 microns) to about 0.0083" (about 210 microns), and such as about 0.0059" (about 149 microns) to about 0.0083" (about 210 microns), inclusive. The slot width may also be measured in U.S. and Canadian "mesh gauge". Embodiments of the screen may have a slot width in a range of from about 635 to about 3 mesh, such as in a range of from about 90 to about 150 mesh gauge, such as about 90, or such as about 100, or such as about 145, or such as about 150 mesh gauge.

It is important to note that traditional non-metallic manufacturing, that is, techniques not associated with 3-D material printing, cannot replicate the slot size required for adjacent screen wire configurations. Without the appropriate or consistent slot width throughout the filter screen, the filtration function of the filter lateral would be defeated.

In embodiment lateral filters, the proximal support ring provides not only support for the proximal connector but also for the filter screen. It also acts as a fluid conduit to permit permeate in the interior of the later filter to pass from the lateral filter. In some embodiments of the filter lateral, the proximal support ring and the filter screen are configured such that they are a unitary, integrated, inseparable and singular component that are connected to one another. As described previously in embodiment filter lateral 100 in Enhancement 2 of FIG. 1, components of the filter screen 130, such as screen support rods 170, may be fully integrated, as previously described, with portions of the proximal support ring 120, such as ridge 122. This is also shown in Enhancement 1 in FIG. 2C with the axial screen support rod configuration, although as mentioned it can occur with any screen support rod configuration.

In embodiment lateral filters, the proximal connector connects to the proximal support ring on the other side from the filter screen. The permeate from the lateral filter passes through the interior of the proximal connector and out from the lateral filter. For embodiment lateral filters, a proximal connector is configured to couple the lateral filter to an external collection means, such as a permeate collection conduit or header, where the external collection means is configured to couple to the proximal connector of the lateral filter.

In some embodiments of the filter lateral, the proximal support ring and the proximal connector are configured such that they appear amalgamated into a unitary, integrated, inseparable, and singular component that is connected to one another. For example, in the Enhancement 1 of FIG. 1, proximal connector 110 and proximal support ring 120 are the same piece of material and have no separation between the two components of the lateral filter 100. Other examples where the proximal connector is internal to the proximal support ring will be described.

The proximal connector may be configured to connect or couple to an external connection, which may an external collection means, using appropriate connecting configurations. This is to permit recovery of the permeate without contaminating it with either filtrate that has not been processed or retentate. For example, as shown in FIG. 1, the proximal connector 110 is a male screw-type connector having external threads 114. Such a connector would frictionally couple with a reciprocal female screw-type connector to form a liquid-tight seal.

Figure 4A:
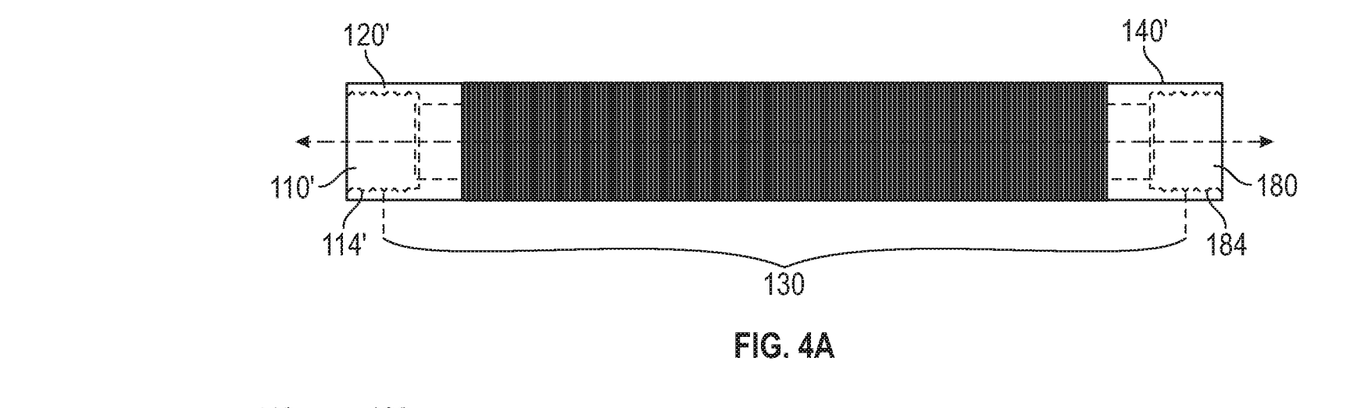
FIG. 4A illustrates an embodiment lateral filter with a female proximal connector and a female distal connector.

FIG. 4A illustrates an embodiment lateral filter with a female proximal connector and a female distal connector. In some other embodiments, such as shown in FIG. 4A, the proximal connector 110' is a female screw-type connector having internal threads 114'. In such embodiments, the permeate from the lateral filter passes through the interior of the proximal support ring, which includes the proximal connector, and out from the lateral filter. As with the previous example, the female screw-type connector would frictionally couple with a reciprocal male screw-type connector to form a liquid tight seal. In such embodiments, the configuration of proximal support ring 120' is such that it accommodates the internal proximal connector 110'.

In other, non-pictured instances, the proximal connector may take one of other commonly known configurations for coupling or connecting to an external collection means, for example, by flange, crows-foot, or ¼-turn connector.

In the instances where the proximal connector is a male or female screw-type connector, the configuration of the proximal connector may be according to the National Pipe Threads (NPT) standard as promulgated by the American National Standard for pipe as accredited by the American National Standards Institute (ANSI). In such instances, the proximal connector may have a pipe thread size in a range of from about 0.125 to about 12 inches (nominal) per NPT, such as 2 inches.

Switching over to the other end of embodiment lateral filters, in some embodiments the distal support ring and the screen are configured such that they appear amalgamated into a unitary, integrated, inseparable, and singular component that is connected to one another. In embodiment lateral filters, the distal support ring provides support for the filter screen as the previously-described proximal support ring does. As described previously in embodiment filter lateral 100 in Enhancement 5 of FIG. 1, components of the filter screen 130, such as screen support rods 170, may be fully integrated with portions of the distal support ring 140. This is also shown in Enhancement 2 in FIG. 2C with the axial screen support rod configuration, although as previously mentioned with the proximal support ring such integration may occur with any screen support rod configuration.

In some embodiments of the filter lateral, the distal support ring and a distal end cap are configured such that they are a unitary, integrated, inseparable and singular component. The distal end cap connects to the distal support ring on the other side from the filter screen. Such a configuration is seen in FIG. 1 as well as Enhancement 5 of the same, where both portions of the filter screen 130 and distal end cap 150 are the same, unified component as distal support ring 140.

In some embodiment lateral filters, a distal connector connects to the distal support ring on the other side of the filter screen. For such embodiment lateral filters, the distal connector may be used to couple a second lateral filter in series to a first lateral filter such that permeate may not only be collected by the first lateral filter but the permeate from the second lateral filter may traverse through the first lateral filter to an external connection means. In such embodiments, the distal support ring and the distal connector are configured such that they are a unitary, integrated, inseparable and singular component, similar to that as previously described for the proximal connector and the proximal support ring. Other examples where the distal connector is internal to the distal support ring will be described.

Figures 4B, 4C:
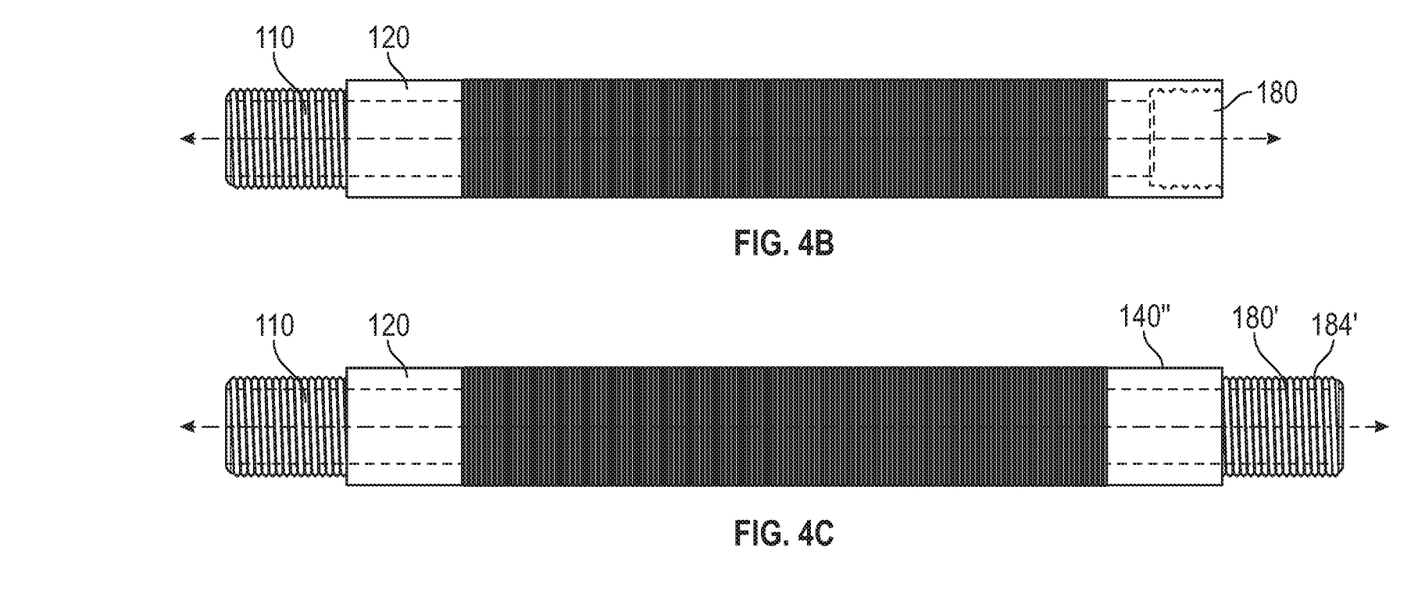
FIG. 4B illustrates an embodiment lateral filter with a male proximal connector and a female distal connector.
FIG. 4C illustrates an embodiment lateral filter with a male proximal connector and a male distal connector.

FIG. 4B illustrates an embodiment lateral filter with a male proximal connector and a female distal connector. In some other embodiments, such as shown in FIGS. 4A and 4B, the distal connector 180 is a female screw-type connector having internal threads 184. In such embodiments, the permeate from a second lateral filter may pass through the interior of both the distal connector 180 and the distal support ring 140" and then further into the first lateral filter. As with the previous example, the female screw-type connector would frictionally couple with a reciprocal male screw-type connector to form a liquid tight seal. In such embodiments, the configuration of distal support ring 140' is such that it accommodates the internal distal connector 180.

FIG. 4C illustrates an embodiment lateral filter with a male proximal connector and a male distal connector. The distal connector may be configured to connect or couple to an external connection, which may include a second lateral filter or an external collection means, using known and appropriate connecting configurations. For example, as shown in FIG. 4C, the distal connector 180' is a male screw-type connector having external threads 184' coupled to distal support ring 140'. In the embodiment lateral filter of 4C, it is noted that distal support ring 140' has a longer lateral length than the same in FIG. 1; embodiments lateral filters are not envisioned to be limited by such dimensions. Such a connector would frictionally couple with a reciprocal female screw-type connector on another lateral filter to form a liquid-tight seal between the two lateral filters.

In other, non-pictured instances, the distal connector may take one of other commonly known configurations for coupling or connecting to an external collection means, for example, by flange, crows-foot, or ¼-turn connector.

In the instances where the distal connector is a male or female screw-type connector, the configuration of the distal connector may be according to the National Pipe Threads (NPT) standard as promulgated by the American National Standard for pipe as accredited by the American National Standards Institute (ANSI). In such instances, the distal connector may have a pipe thread size in a range of from about 0.125 to about 12 inches (nominal) per NPT, such as 2 inches.

Methods of Use

A system comprising one or more of the embodiment lateral filters may be configured in a variety of ways and for a number of fluid services to reduce or exclude solids from an introduced fluid to produce a permeate with a reduced or no solids content. The solids in the permeate, if any, will have a smallest dimension that is no larger than the width of the slot in the filter screen of the embodiment lateral filter. The embodiment filter system can be used a one or more filters, such as a plurality of filters in an array setup, to extract a multiple amount of permeate from an introduced fluid with entrained solids.

For embodiment lateral filters, it is envisioned that both aqueous and non-aqueous fluids, and mixtures thereof, may be filtered through the lateral filter. As previously discussed, any solids that have a smallest dimension that is greater than the width of the slot in the filter screen regardless of introduction fluid type will not pass through the filter screen and into the interior of the lateral filter as part of the permeate. In some embodiments, the introduced fluid entrained with solids is an aqueous fluid. Filtration of waters either from natural sources or from processes may be introduced to lateral filters for processing. Fresh and potable waters from surface sources (lakes, rivers, swamps), subterranean sources (aquifers) and synthetic sources (desalinization, boiler feed) may be filtered using the lateral filter. Food-grade liquids and suspensions that have very small solids, such as juices, brewed beverages, and soups, may see process advantages in using the lateral filter.

Other non-potable sources of water may also use the lateral filter to remove solids before they are further processed or disposed of include, but are not limited to, gray water, black water, blue water, brown water, storm runoff, sea water, brackish water, agricultural waste and runoff, formation water, brines, chemical process water, reverse-osmosis retentate, and mining slurries. An example is production water that is reintroduced into a producing reservoir. Such water may be filtered for minerals, small mining and hydrocarbon solids, and other impurities that may clog formation pores, and then be reintroduced into the formation through an injection well to support secondary recovery. Removing any solids before pumping the production water to the injection well prevents the sedimentation and clogging of the production water return line between the point of production water recovery and the point of production water introduction.

In some embodiments, the introduced fluid entrained with solids is a non-aqueous based fluid. In some embodiments, the non-aqueous fluid is a hydrocarbon-based fluid. For example, a filter lateral may be used to introduce a hydrocarbon-based fluid to remove large crystals, carryover debris, or portions of minerals include, but are not limited to, salt crystals, fine minerals, sediment, sand, sulfur, and ultra-large molecular aggregated hydrocarbons, such as asphaltenes, may be blocked by the lateral filter. In another example use of filtration, waste hydrocarbon-based products, such as used motor oil, that may contain amalgamated solids, metals, and residues, may be removed from a filtrate so that the liquid may be further treated or refined. Food-grade non-aqueous fluids, such as fresh or "raw" vegetable oils and extracts from fruits, nuts, beans or animal matter, may be filtered for debris by introducing the fluid to the filter lateral. In a similar manner, waste edible oils, such as used vegetable oils or liquid greases may be strained of residues and congealed portions using a lateral filter.

Techniques may use the lateral filter as part of a process or purification operation. For example, Fuller's earth, activated carbon or activated clays, which may be used to remove color, may be separated from a permeate by the lateral filter. Pre-chilling an introduced non-aqueous fluid may cause paraffins and waxes to crystalize as the temperature less than the cloud point of the introduced liquid. The lateral filter to improve clarity and purity of the fluid may strain such crystals. The lateral filter may also be used to break down bubbles of a discontinuous fluid phase into smaller bubbles within a continuous fluid phase, for example, a water-in-oil (W/O) emulsion. The mechanical shear of the emulsion passing through the narrow slot of the filter screen may cause the discontinuous phase to form smaller bubbles in the permeate than what is in the filtrate.

In an embodiment of the method of use, a fluid having entrained solids is introduced into the lateral filter from the exterior via the filter screen. The introduction causes liquids and solids that may traverse the width of the slot to form a permeate in the interior of the lateral filter. Solids in the introduced fluid that are too large to pass through the slot in the filter screen do not enter the interior of the lateral filter. The resulting permeate may have a reduced solids content or no solids versus the solids content of the introduced fluid. The size of any solids in the permeate is such that the smallest dimension of the solids is less than the width of the slot in the filter screen. The permeate passes through the lateral filter and out of the lateral filter via the proximal connector.

In instances where there are two or more lateral filters coupled in series to one another, permeate from a first lateral filter may pass into a second lateral filter. The permeate from the first lateral combines with the permeate of the second filter, forming a combined permeate. The combined permeate then passes from the second lateral filter, and similarly for more than two coupled in series.

Example System and Use

The following examples illustrate one or more features of the present disclosure. It should be understood that these examples are not intended to limit the scope of the disclosure or the appended claims in any manner.

Figure 5:
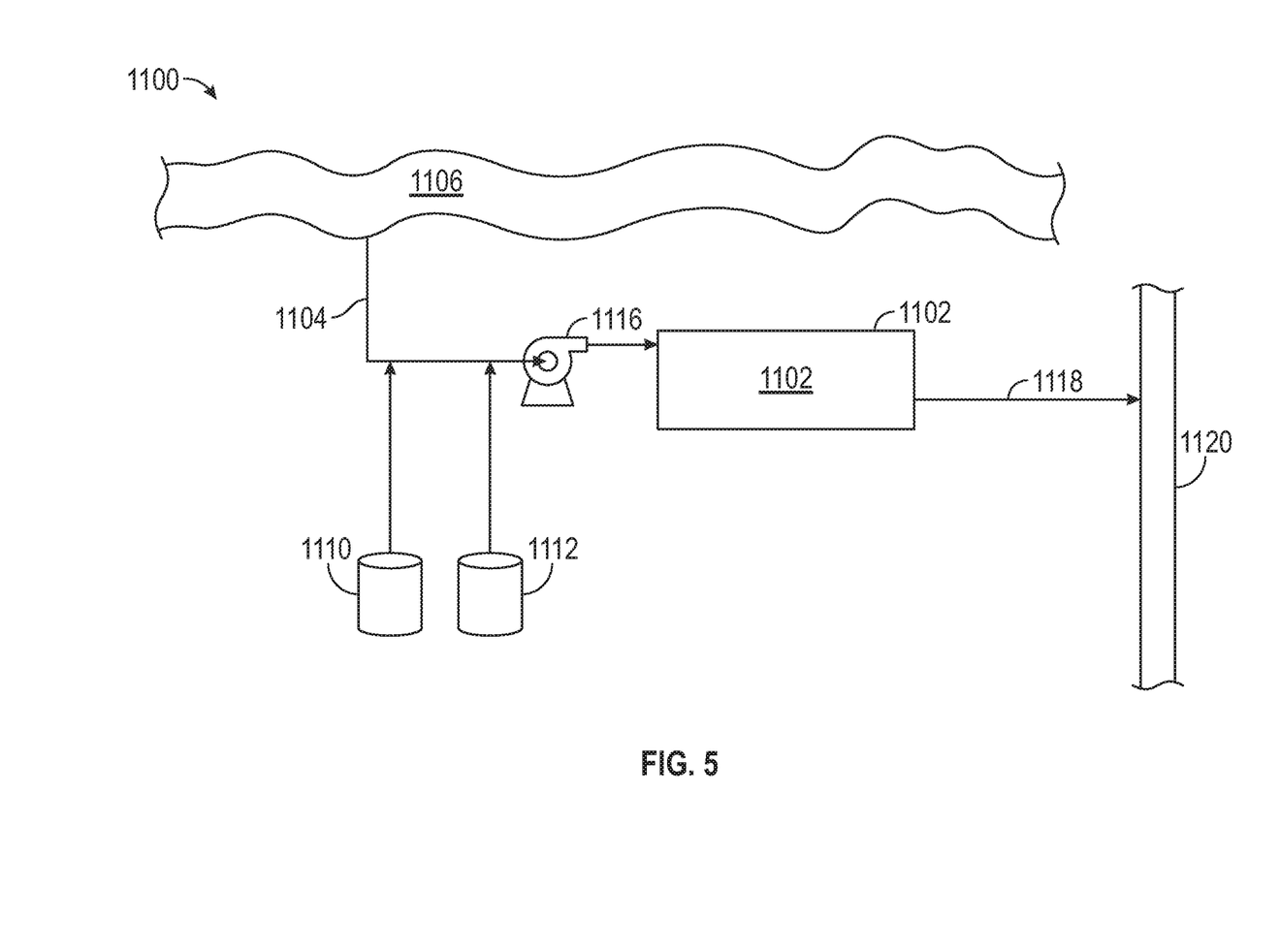
FIG. 5 is a schematic of an example sand filter system that incorporates embodiment lateral filters.

FIG. 5 is a schematic of an example sand filter system that incorporates embodiment lateral filters. System 1100 includes sand filter 1102, which incorporates one or more embodiment lateral filters. Sand filter 1102 is configured to receive via a feed conduit 1104 a fluid entrained with solids. The water source 1106 of the fluid entrained with solids may be a natural occurring body of water, such as a river, a delta or an ocean, or a canal or conduit conveying such. In the example embodiment, the fluid entrained with water is raw seawater, and the water source 1106 is a seawater intake canal.

The introduced fluid in this example is raw seawater. "Raw seawater" means seawater that has not been appreciably filtered or processed from its natural condition. In such an instance, items such as canals, pumps, safety gratings and gates, which may route the seawater towards the sand filter and prevent the intake of large objects, for example, ocean-borne debris, plants and animals, are not considered filters per se and do not alter the chemical makeup of the raw seawater fundamentally. Such straining effect on raw seawater is appreciated in the broadest context that such screens provide; however, such actions are secondary to the safety benefit provided to the facility and for the protection of life.

A conduit may introduce a polyelectrolyte from polyelectrolyte tank 1110, a disinfectant from disinfectant tank 1112, or a combination thereof, into the fluid entrained with solids heading towards the sand filter 1100 to form a pre-treated fluid entrained with solids. A feed pump 1116 pressurizes the pre-treated fluid such that a pressurized, pre-treated fluid entrained with solids forms. Filter vessel 1102 is configured such that the pressurized, pre-treated fluid is processed in the sand filter 1102 by embodiment lateral filters to produce a permeate with solids, if any, having a smallest dimension less than the width of the slot of the filter screen on the embodiment lateral filters, as previously described. The collective permeate passes from the sand filter 1102 via a filtered seawater conduit 1118 to a filtered seawater header 1120. The filtered seawater header 1120 services processes downstream but also may aggregate filtered seawater from a plurality of systems 1100 operating in parallel to one another.

The introduced pressurized, pre-treated fluid may have an elevated fluid pressure. Elevated fluid pressure, that is, a pressure greater than atmospheric, is used to drive the filtrate through the filter screens of embodiment lateral filters in sand filter by overcoming surface tension effects. The pressurized, pre-treated fluid is introduced into the sand filter having a pressure in a range of from just greater than atmospheric pressure to about 200 pounds per square inch gauge (psig), such as in a range of from about 50 psig to about 190 psig, such as in a range of from about 100 psig to about 180 psig, such as in a range from 140 psig to about 160 psig, such as 150 psig.

The introduced pressurized, pre-treated fluid entrained with solids may have a fluid temperature. In an embodiment of the method of use, a fluid having entrained solids is introduced into an embodiment sand filter having a temperature in a range of from about 0° C. to about 50° C., or in a range of from about 10° C. to about 45° C.

As previously described, optionally the pressurized, pre-treated fluid includes a polyelectrolyte. The polyelectrolyte may be introduced such that solid particles and the polyelectrolyte coalesce into larger particles. Such aggregated particles tend to collect in the top portion of the sand filter where coarse filtration media is present. An example of a useful polyelectrolyte is referred to as FA 1116 supplied by Clariant.

As previously described, optionally the pressurized, pre-treated fluid includes a disinfectant. The disinfectant may be introduced so as to prevent bacterial and organic growth on the inside of pipes downstream, such as the sand filter. An example of a useful disinfectant is a hypochlorite solution. When the disinfectant is introduced into the fluid with entrained solids, the pressurized-pre-treated fluid has a free chlorine value in a range of greater than 0 ppm (parts per million) to about 10 ppm, such as in a range of from about 1 ppm to about 7 ppm, such as in a range of from about 2 to about 5 ppm.

The permeate passing from the sand filter should only have particles having a smallest dimension that is less than the width of the slot on the screen wire of the filter screen, if any at all. In some embodiments, the number of particles in the permeate having a smallest dimension of 2000 nanometers or less in the permeate is in a range of from 0 to about 200 microns per 0.5 milliliters (mL) of permeate. Given that the lateral filter screen has a slot width that does not permit particles having a smallest dimension of greater than 150 nm, any particle detected in the permeate should not have a smallest dimension larger than 150 nm, let alone 2000 nm.

Although not pictured but as previously suggested, in some embodiment systems there may be more than one sand filters configured to operate in parallel to each another. That is, there may be two or more sand filters sharing a common feed conduit 1104, water source 1106, polyelectrolyte tank 1110, disinfectant tank 1112, filtered seawater conduit 1118, and filtered seawater header 1120. In some embodiment system, the number of sand filters configured to operate in parallel with one another may be in a range of from about 2 to about 200, such as 112.

Figure 6A:
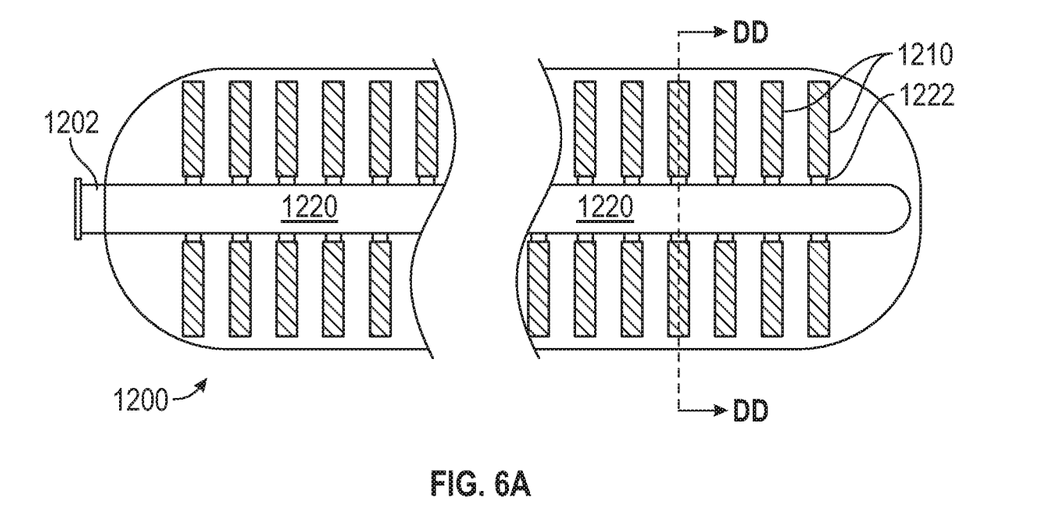
FIGS. 6A-B illustrate portions of a sand filter using an array of embodiment filters for an embodiment system.
Figure 6B:
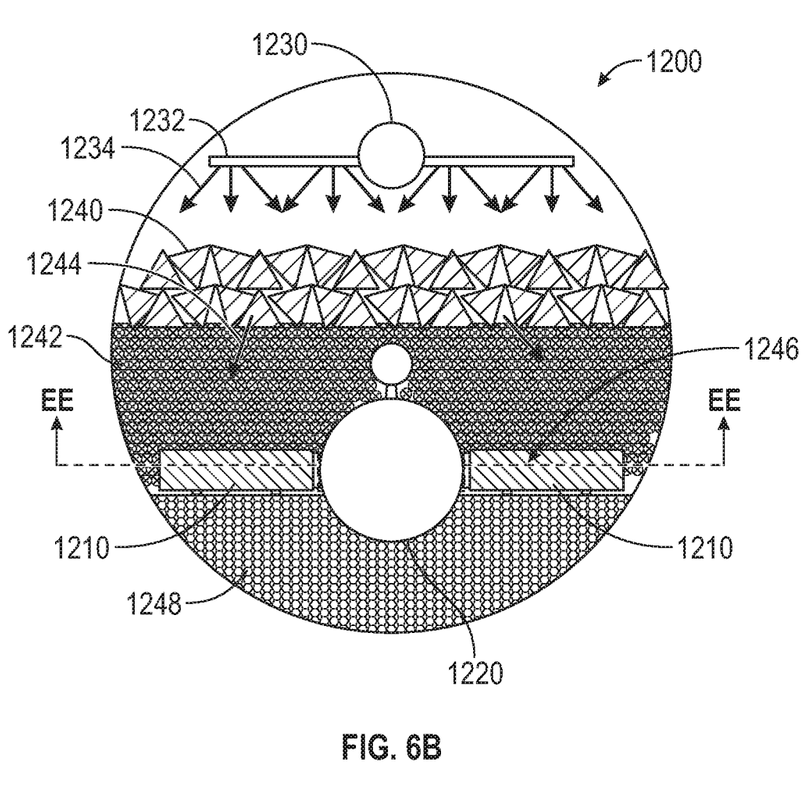

FIGS. 6A-B illustrate portions of a sand filter using an array of embodiment filters for an embodiment system. A portion of an embodiment system that incorporates one or more embodiment filters may include a sand filter 1200 such as shown in FIGS. 6A-B. Pressurized, pre-treated fluid entrained with solids is introduced into the sand filter 1200 via a seawater inlet (not shown), and the collective permeate is passed from the sand filter 1200 via a sweater outlet 1202.

FIG. 6A shows a horizontal slice of sand filter 1200 along view line EE as given in FIG. 6B. FIG. 6A does not show filter media for the sake of clarity. Embodiment sand filter 1200 may comprise several parts, including a plurality of embodiment lateral filters 1210, such as embodiment lateral filter 100 as previously described, arranged in a parallel dual-row array. The plurality of embodiment lateral filters 1210 couple to a permeate bottom header 1220. Each embodiment lateral filter 1210 couples to permeate bottom header 1220 at permeate bottom connector 1222 such that the lateral filters 1210 are arranged in parallel configuration with each other on both sides of the permeate bottom header 1220. Permeate bottom header 1220 is located along the center of the sand filter 1200.

As pressurized, pre-treated fluid is introduced to the plurality of lateral filters in sand filter, the formed permeate passes from each lateral filter into the permeate bottom header, where it is aggregated into collective permeate. The collective permeate in the permeate bottom header then passes from the sand filter via permeate bottom connector and onto filtered seawater header as previously described.

FIG. 6B shows a vertical slice of sand filter 1200 along view line DD as given in FIG. 6A. Embodiment sand filter 1200 may further comprise a top seawater header 1230 that runs the length of sand filter 1200 conveying the introduced pressurized, pretreated fluid entrained with solids to shower laterals 1232. A plurality of shower laterals 1232 are configured to distribute (arrows 1234) the introduced pressurized, pretreated fluid onto course filter media 1240. Course filter media 1240 is piled above fine filter media 1242 and collects large particles, such as those aggregated with the optional polyelectrolyte. As the pressurized, pretreated fluid is forming into the filtrate, it passes (arrows 1244) through the fine filter media 1242. The fine filter media 1242 is also distributed above and between the plurality of embodiment lateral filters 1210 to strain smaller solids from the filtrate before the filtrate is introduced (arrows 1246) into the lateral filters 1210. Under support material 1248 is positioned below the plurality of embodiment lateral filters 1210. The under-support material 1248 is made of concrete to physically support the lateral filters 1210 and the permeate bottom header 1220.

FIGS. 6A-B for the sake of clarity does not show filter vessel 1200 with all possible attachments or fittings. This is to ensure that one of ordinary skill in the art appreciates the described portions of sand filter 1200 directly associated with embodiment filters 1210. One of ordinary skill in the art understand that other inlets, outlets, and monitoring fitting, such as for air, seawater inlets, inlets for manual entry, and purging systems, as may be required or desired for any given embodiment process, may be used for the safe and efficient operation of sand filter 1200.

In embodiment systems, there are one or more of the embodiment lateral filters in each embodiment sand filter. In some embodiment systems, there are a plurality of embodiment filters used as part of an array, such as shown in FIG. 6A. In some embodiments, the number of embodiment filters may be in a range of from about 2 to about 1000, such as in a range of from about 5 to about 500, such as in a range of from about 10 to about 200, such as in a range of from about 25 to about 150, such as in a range of from about 50 to about 125, such as in a range of from about 75 to about 100, such as 84 or 90.

In an embodiment of the method of use, a fluid having entrained solids is introduced into a filter vessel containing one or more embodiment filters. The filter vessel may be configured as previously described or in another configuration. The filter vessel is configured to distribute the fluid to one or more embodiment filters such that the fluid having entrained solids is introduced to the embodiment filter through the exterior via the filter coil. The permeate from each embodiment filter migrates into the permeate collection sleeve of each filter and then passes from the filter. The filter vessel aggregates the permeate in the permeate underdrain connector, and then the permeate passes the aggregated permeate from the filter vessel.

In the prior discussion of the various potential configurations of embodiment filters, one of ordinary skill in the art can appreciate the strength of the construction of embodiment filters. During normal operation in an embodiment system such as sand filter, a significant amount of weight is borne by the embodiment filters. The weight of course and fine filter media, both soaked with sea water in various states of filtration, retained solids in both filter medias, and the force of the aqueous solution showering down onto the filter media, produces a significant amount of force onto the screen filter of embodiment filter laterals during normal operation. The formation of many or all of the components of embodiment lateral filters as singular, unitary units can permit the distribution of force generated by the weight of the matter above it throughout the apparatus. Being able to distribute such stress not only extends the lifespan of the embodiment lateral filters but also prevent damage that may cause a breach in any one of the filter screens. Such a breach would permit solids having a smallest dimension greater than the width of the slot of the lateral filter to enter permeate recovery. Such a breach may require shutting down the entire system to make a repair and to prevent damage to downstream equipment. Avoiding acute shutdowns necessarily improves online efficiency of the overall system.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps. The term "comprising," and derivatives thereof, is not intended to exclude the presence of any additional component, step or procedure, whether or not the same is disclosed. In order to avoid any doubt, all compositions claimed, through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A lateral filter comprising:
a filter screen,
wherein the filter screen comprises one or more screen wires and a screen support rod,
wherein the filter screen consists of a non-metallic material,
wherein the filter screen in part defines an interior-facing side and an exterior-facing side of the lateral filter,
wherein adjacent screen wires of the one or more screen wires, or adjacent passes or portions of a screen wire, are spaced from one another thereby defining a perimetrical slot having a width through which a fluid and a solid having a smallest dimension that is less than the width of the slot may traverse from the exterior-facing side to the interior-facing side of the lateral filter,
wherein the filter screen is a unitary, integrated, inseparable, and singular component, and
wherein the non-metallic material is a polymeric material.

2. The apparatus of claim 1 where the screen wire is in a circumferential configuration and where the screen support rod is in an axial configuration.

3. The apparatus of claim 1 where the lateral filter further comprises a proximal support ring, where the proximal support ring consists of the non-metallic material, and where the proximal support ring and the filter screen are a unitary, integrated, inseparable, and singular component.

4. The apparatus of claim 1 where the lateral filter further comprises both a proximal connector and a proximal support ring, where the proximal connector consists of the non-metallic material, where the proximal support ring consists of the non-metallic material, and where the proximal connector and the proximal support ring are a unitary, integrated, inseparable, and singular component.

5. The apparatus of claim 4 where the proximal connector is configured as a male screw-type connector having external threads.

6. The apparatus of claim 1 where the lateral filter further comprises a distal support ring, where the distal support ring consists of the non-metallic material, and where the distal support ring and the filter screen are a unitary, integrated, inseparable, and singular component.

7. The apparatus of claim 1 where the lateral filter further comprises a distal support ring and a distal end cap, where the distal end cap consists of the non-metallic material, where the distal support ring consists of the non-metallic material, and where the distal end cap and the distal support ring are a unitary, integrated, inseparable, and singular component.

8. The apparatus of claim 1 where the lateral filter further comprises a distal support ring and a distal connector, where the distal connector consists of the non-metallic material, where the distal support ring consists of the non-metallic material, and where the distal connector and the distal support ring are a unitary, integrated, inseparable, and singular component.

9. The apparatus of claim 8 where the distal connector is configured as a female screw-type connector having internal threads.

10. The apparatus of claim 1 where the lateral filter further comprises a proximal connector, a proximal support ring, a distal support ring, and a distal end cap, where the proximal connector, the proximal support ring, the distal support ring, and the distal end cap each consists of the non-metallic material, and where the filter screen, the proximal connector, the proximal support ring, the distal support ring, and the distal end cap are a unitary, integrated, inseparable, and singular component.

11. The apparatus of claim 1 where the non-metallic material is a polymer comprising acrylonitrile butadiene styrene (ABS).

12. The apparatus of claim 1 where the width of the slot is in a range of from about 90 to about 150 mesh gauge.

13. A method, comprising:
introducing a fluid entrained with solids to a lateral filter such that the introduced fluid passes into the lateral filter through a filter screen of the lateral filter and forms a permeate fluid in an interior of the lateral filter,
where any solids in the permeate fluid have a smallest dimension that is not greater than a width of a slot in a filter screen of the lateral filter,
where the lateral filter consists of a non-metallic material, is a unitary, integrated, inseparable, and singular component, and comprises the filter screen as claimed in claim 1.

14. The method of claim 13 where the introduced fluid entrained with solids is an aqueous fluid.

15. The method of claim 14 where the introduced fluid entrained with solids comprises raw seawater, a polyelectrolyte, and a disinfectant.

16. The method of claim 13 where the introduced fluid entrained with solids is introduced as a pressure in a range from greater than atmospheric pressure to 200 pounds per square inch gauge (psig).

17. A system comprising a sand filter further comprising a lateral filter,
where the sand filter is configured to receive an introduced fluid entrained with solids and to pass a permeate fluid,
where any solids in the permeate fluid have a smallest dimension that is not greater than the width of a slot in a filter screen of the lateral filter,
where the lateral filter consists of a non-metallic material and is a unitary, integrated, inseparable, and singular component,
wherein the filter screen comprises the filter screen as claimed in claim 1.

18. The system of claim 17 where the sand filter further comprises both a coarse filter media positioned above a fine filter media, where both are within the sand filter and exterior to the lateral filter.

19. The system of claim 18 where the lateral filter comprises more than one lateral filter, where the sand filter is configured to distribute the introduced fluid entrained with solids to the more than one lateral filter, and where the sand filter is configured to aggregate the permeate fluid passed from the more than one lateral filter before passing the permeate fluid from the sand filter.

20. The system of claim 17 where the introduced fluid entrained with solids comprises raw seawater, a polyelectrolyte, and a disinfectant.

* * * * *